United States Patent [19]

Scott et al.

[11] Patent Number: 4,917,504

[45] Date of Patent: Apr. 17, 1990

[54] COMMUNICATIONS HEADSET

[75] Inventors: Charles G. Scott, Aptos; Robert J. Bernardi, Scotts Valley, both of Calif.

[73] Assignee: Plantronics, Inc., Santa Cruz, Calif.

[21] Appl. No.: 348,052

[22] Filed: May 5, 1989

[51] Int. Cl.$^4$ .................... H04R 1/04; H04R 1/10; H04R 25/02
[52] U.S. Cl. .................... 381/187; 381/169; 381/68.7
[58] Field of Search .............. 381/183, 187, 188, 68.7, 381/169

[56] References Cited

U.S. PATENT DOCUMENTS

| | | | |
|---|---|---|---|
| 2,586,644 | 2/1952 | Gilbert | 381/187 |
| 4,354,065 | 10/1982 | Buettner | 381/187 |
| 4,727,582 | 2/1988 | de Vries et al. | 381/187 |

FOREIGN PATENT DOCUMENTS

| | | | |
|---|---|---|---|
| 1082541 | 9/1967 | United Kingdom | 381/187 |
| 2079099 | 1/1982 | United Kingdom | 381/187 |
| 1397803 | 3/1965 | France | 381/187 |

Primary Examiner—Forester W. Isen
Attorney, Agent, or Firm—Arnold, White & Durkee

[57] ABSTRACT

A lightweight, monaural communications headset is disclosed which is readily adjustable to be worn on either the right or left ear of a wearer. The disclosed headset consists of two housings, one for holding electronic circuitry for the headset, and the other for holding an acoustical transmitter. The two housings are coupled with a swivel or ball-and-socket coupling, so that the device may be positioned behind either the right or left ear of a wearer. The transmitter housing is provided with acoustical port holes on both of its sides to further facilitate the reversible wearing of the device. The disclosed headset is constructed from lightweight materials so that it is self-supporting, and causes minimal discomfort to the wearer.

4 Claims, 5 Drawing Sheets

FIG.4c
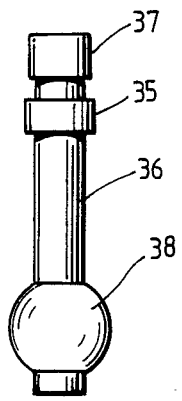
FIG.6a
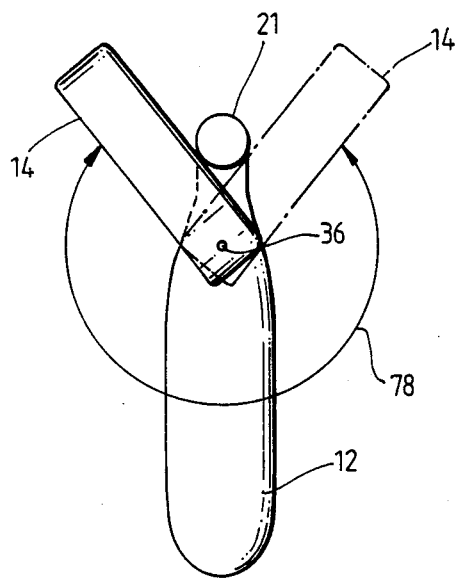
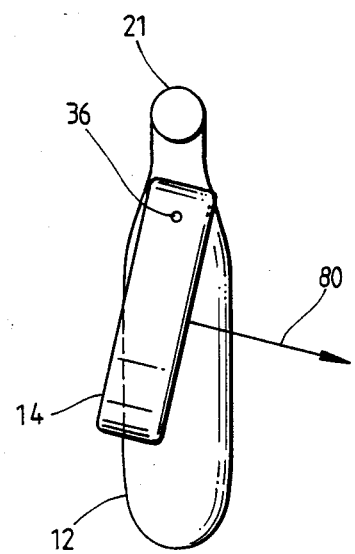
FIG.6b
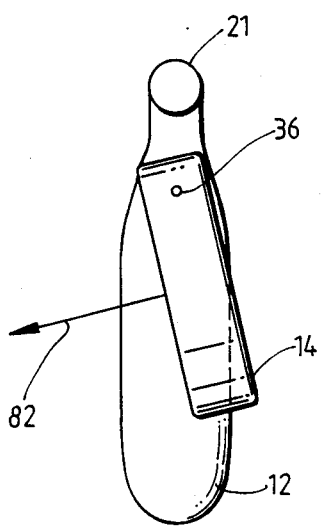
FIG.6c 4,917,504

COMMUNICATIONS HEADSET

BACKGROUND OF THE INVENTION

This invention relates generally to communications headsets, and more particularly to self-supporting, monaural headsets containing a microphone and a receiver.

Communications headsets can be used in a diversity of applications, and are particularly effective for telephone operators, radio operators, aircraft personnel, and for other situations wherein it is desirable to support "hands free" access to communications systems. Accordingly, a wide variety of headsets have been known in the prior art.

Known communications headsets can be broadly characterized on the basis of several fundamental aspects of their design and function, including: whether they deliver monaural or binaural sound; whether they are right-handed, left-handed or neither; whether they employ an invasive ear tip or a non-invasive loudspeaker in establishing a receiver-to-ear acoustical coupling; how they are physically supported on the user; their acoustical characteristics; and their economic qualities.

Typically in the art, headsets which deliver binaural sound (i.e. ones which have acoustical transducers for both ears) may be neither right-handed nor left-handed, and may utilize some type of headband arrangement to secure receiver elements beside each ear. Although generally providing very stable support for the headset, headbands have the disadvantages that they increase the size and weight of the headset, and tend to be uncomfortable or obtrusive to the user.

Monaural headsets (having only a single receiver situated near one ear) may be quite compact, and therefore may not require the high stability of a headband. Uneven weight distribution can be a problem for monaural headsets, however, since the majority of the headset components are concentrated on one side of the head. Known self-supporting monaural headsets often rely on a molded ear tip inserted into the entrance of the auditory meatus for securing the device to the user. Such invasive eartips have the disadvantages of being uncomfortable and unhygenic. In addition, invasive eartips must conform closely to the geometry of a user's ear in order to be stable and secure, and are therefore typically either right-handed or left-handed only, and may not be optimally effective on all users.

Ergonomic considerations in the design of communications headsets include the comfort of the device, the ease of putting the headset on and subsequently adjusting it for use, the restriction of user mobility resulting from the wearing of the headset, as well as the quality of sound delivered by the device.

Acoustical qualities of communications headsets are often closely dependent on other aspects of the design. For example, the acoustical quality of the sound heard by a user is clearly affected by the nature of the receiver-to-ear seal. Invasive ear tips provide a good seal, but suffer from the aforementioned problems of comfort and hygiene. Non-invasive loudspeaker-type receivers, on the other hand, are more susceptible to acoustical degradation from background-level sound and attenuation of the acoustical wave passing through open space from the receiver to the auditory meatus.

Another acoustical problem results from the arrangement and size of components in a headset. Naturally, it is desirable to utilize microphones and receivers of the smallest possible size and least weight, making the resulting headset as light and compact as possible. Typically, however, smaller components deliver a weaker acoustical signal, and must accordingly be closely coupled to the user. In addition, care must be taken, especially with miniaturized components in close proximity to each other, that the receiver(s), and transmitter of a headset be mechanically and acoustically decoupled. Lastly, the use of acoustic tubes within a headset to carry sound from its source to a transmitter or from a receiver to a user's auditory canal can subject the acoustical signals to undesirable resonance effects and other forms of interference, thus decreasing the overall frequency response and sound quality of the headset.

SUMMARY OF THE INVENTION

It is a general feature of the present invention to provide a lightweight, self-supporting headset which can be comfortably and securely fitted to a wide range of users without undue individual attention.

It is a further feature of the present invention to provide a headset which is shaped and constructed to be worn comfortably and stably behind the ear of a wearer.

It is still another feature of the present invention that a satisfactory receiver-to-ear coupling is established with a wearer's left or right ear with equal ease, and without the use of an invasive ear tip.

In general, the foregoing and other features are achieved, in accordance with the present invention, with a headset comprising two housings coupled by means of a swivel joint or a ball-and-socket joint, wherein one housing containing electronic circuitry and a microphone transducer is contoured to fit comfortably behind the ear and engage the ear generally at the top, while the second housing, which holds a miniature loudspeaker-type acoustical transducer, is adjusted at the coupling joint to a suitable position adjacent to the wearer's outer ear. A telescopically adjustable flexible voice pick-up tube originates generally near the top of the first housing and is easily adjusted so that its distal end is situated in close proximity to the wearer's mouth.

In the alternative, the microphone can be disposed at the end of a support boom coupled to the first housing, eliminating the need for a voice pick-up tube to carry acoustical signals to a microphone in the first housing.

BRIEF DESCRIPTION OF THE DRAWINGS

The novel features believed characteristic of a headset of the present invention are set forth in the appended claims. The invention itself, however, as well as other features and advantages thereof, will be best understood by reference to a detailed description of a specific embodiment which follows, when read in conjunction with, the accompanying drawings, wherein: accordance with one embodiment of the present invention;

FIGS. 4a, 4b, and 4c are illustrations of a ball-and-socket joint coupling the housings of FIGS. 1 and 3;

FIGS. 6a, 6b and 6c are illustrations showing the adjustment capabilities of the headset of FIG. 1.

DETAILED DESCRIPTION OF A SPECIFIC EMBODIMENT

Figure 1:
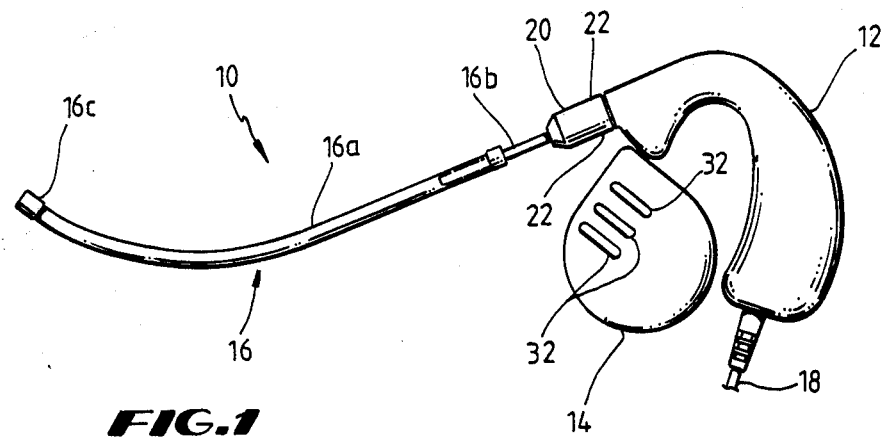
FIG. 1 is an illustration of a headset in accordance with one embodiment of the present invention.

Referring to FIG. 1, a headset in accordance with one embodiment of the present invention is illustrated, designated generally as 10. Headset 10 comprises a first molded housing 12, a second molded receiver housing 14 coupled to first molded housing 12 in a manner hereinafter described, a telescoping voice pick-up tube 16 originating generally near the top of first molded housing 12, and an electrical cable 18 originating generally near the bottom of first molded housing 12. Voice pick-up tube 16 includes telescoping portions 16a and 16b allowing tube 16 to be extended or retracted such that the distal end 16c of pick-up tube 16 may be positioned adjacent to a wearer's mouth. Tube portion 16a is preferably made of a plastic, or another suitably flexible and lightweight material, while tube portion 16b is made of stainless steel or another suitably rigid material for facilitating a sufficiently tight frictional seal with a flanged end 16d of flexible tube 16a. Rigid tube 16b is detachably coupled to housing 12 by means of a ferrule 20. In particular, tube 16b is secured to housing 12 through slots in the sides of ferrule 20 which releasably engage a pair of pins 22 mounted in and extending radially from a cylindrical protrusion 21 of housing 12. Pins 22 are more clearly shown in FIG. 2. Ferrule 20 is of a conventional structure well known in the art to allow for angular adjustment of pick-up tube 16.

Figure 2:
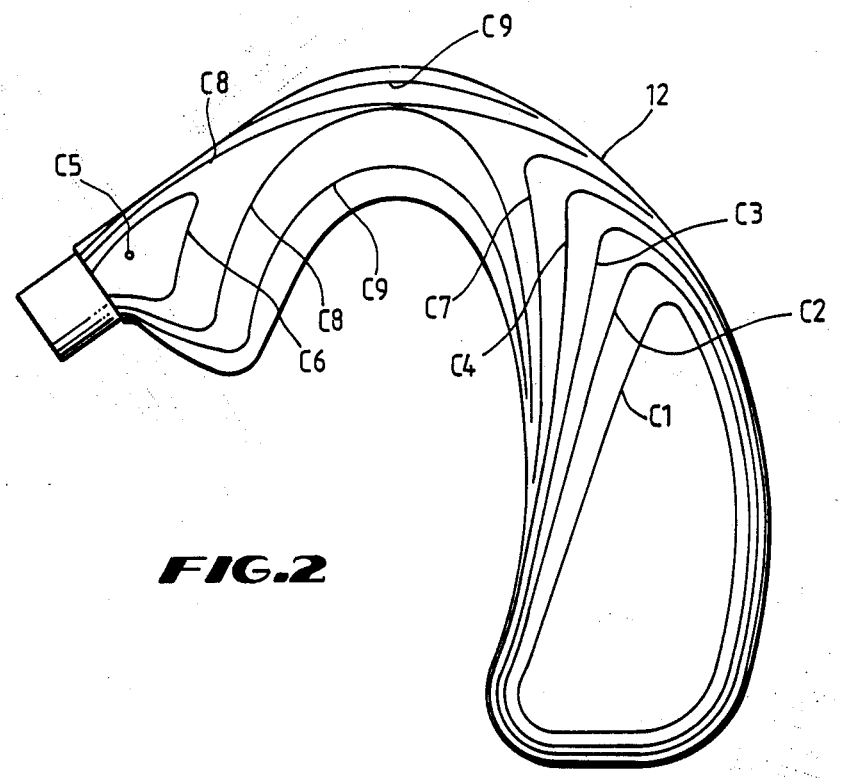
FIG. 2 is an illustration of one housing of the headset of FIG. 1 depicting its contoured shape.

Housing 12 may comprise two mating parts which are affixed to one another as, for example, by pins, sonic bonding, or the like. When assembled, housing 12 is contoured to fit snugly but comfortably behind the ear of a user. Referring to FIG. 2, a contour diagram of housing 12 is shown. Contour line C1 indicates the region of housing 12 having a thickness of approximately 0.4 inches; contour line C2 indicates the region of housing 12 having a thickness of approximately 0.36 inches. Housing 12 has a thickness of about 0.32 inches at contour line C3, 0.28 inches at line C4, and 0.26 inches at line C5. At lines C6 and C7, housing 12 has a thickness of approximately 0.24 inches, at line C8 a thickness of approximately 0.2 inches, and at line C9 a thickness of approximately 0.16 inches. It should be noted that the contour lines C1 through C9 of FIG. 2 are meant to indicate only generally the thickness of housing 12, and not to indicate boundaries of transition between one thickness and another; housing 12 is smoothly formed from molded ABS or the like, as previously described, and its surfaces are generally devoid of sharp or highly angular edges which could cause discomfort to a wearer.

Figure 3:
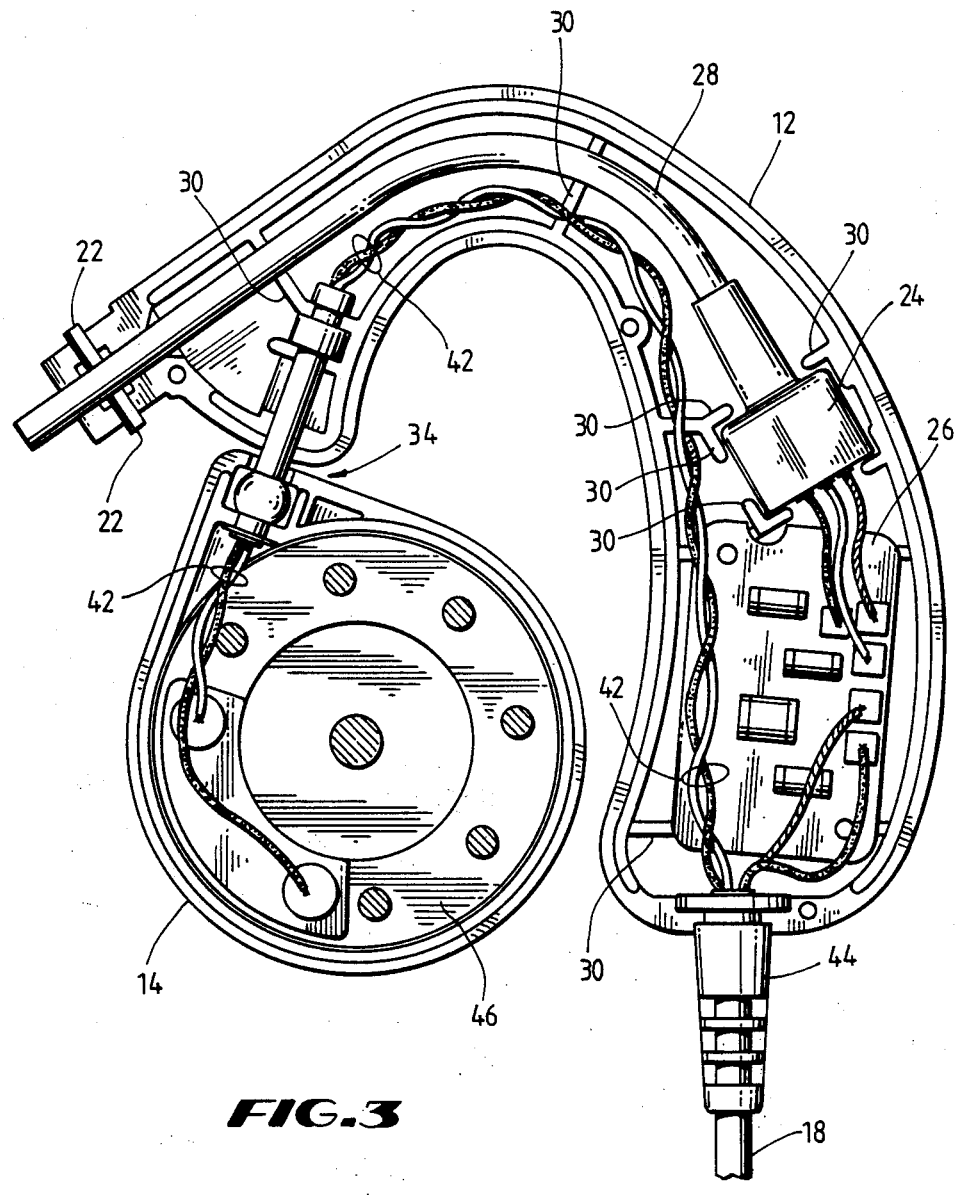
FIG. 3 is an enlarged illustration of both housings of the headset of FIG. 1.

Referring now to FIG. 3, a greatly enlarged view of housings 12 and 14 is shown with one side of each housing 12, 14 removed to expose internal elements. The contents of housing 12 include a microphone transducer 24 and a printed circuit board 26. Microphone 24 is acoustically coupled to rigid portion 16b of voice tube 16 via connecting tube 28, which meets an end of rigid voice tube 16b within ferrule 20. The coupling of connecting tube 28 with rigid voice tube 16b occurs generally within ferrule 20. As previously noted, ferrule 20 releasably engages housing 12 by means of pins 22. Connecting tube 28, microphone 24, and printed circuit board 26 are each supported within housing 12 by means of appropriately formed support struts 30, which struts 30 are preferably integral internal features that may be formed during the molding process of housing 12.

With continued reference to FIG. 3, receiver housing 14 contains a loudspeaker-type receiver transducer 46. Housing 14, like housing 12, is preferably constructed from two mating halves; in order to expose internal components of the receiver, one half of housing 14 is not shown in FIG. 3. As indicated in FIG. 1, each half of housing 14 provided with acoustical port holes 32 on its substantially planar face, for allowing sound produced by receiver transducer 46 to exit receiver housing 14 and be audible to a person wearing headset 10 on either the right or left ear. Receiver housing 14 is coupled to housing 12 by means of a joint designated generally as 34, adapted to allow for adjustment of receiver housing 14 with respect to housing 12. A ball-and-socket joint 34 is preferred, but a swivel joint could be used. An enlarged view of ball-and-socket joint 34 is shown in FIG. 4a. Tubular mounting beam 36 is rigidly supported within housing 12 by support struts 30. A circular collar 35 around a portion of beam 36 in housing 12 is received between supports 30, functioning to increase the stability of joint 34. Although tubular beam 36 is free to rotate in place within housing 12, collar 35 can serve to increase the frictional resistance to this rotation, so that the headset tends to remain in its adjusted position during use. A cap 37 is dispose on the end of beam 36 in housing 12 to prevent beam 36 from sliding axially out of housing 12. As an alternative to cap 37, beam 36 may be provided with a flared end to achieve the same result.

With continued reference to FIG. 4a, beam 36 enters housing 14 via a hole 40 therein. The inner diameter of hole 40 is larger than the outer diameter of tubular mounting beam 36, creating gaps 39 between housing 14 and beam 36. Formed around the end of beam 36 in housing 14 is a ball 38 which is frictionally supported within a cavity 41.

Figure 4B:
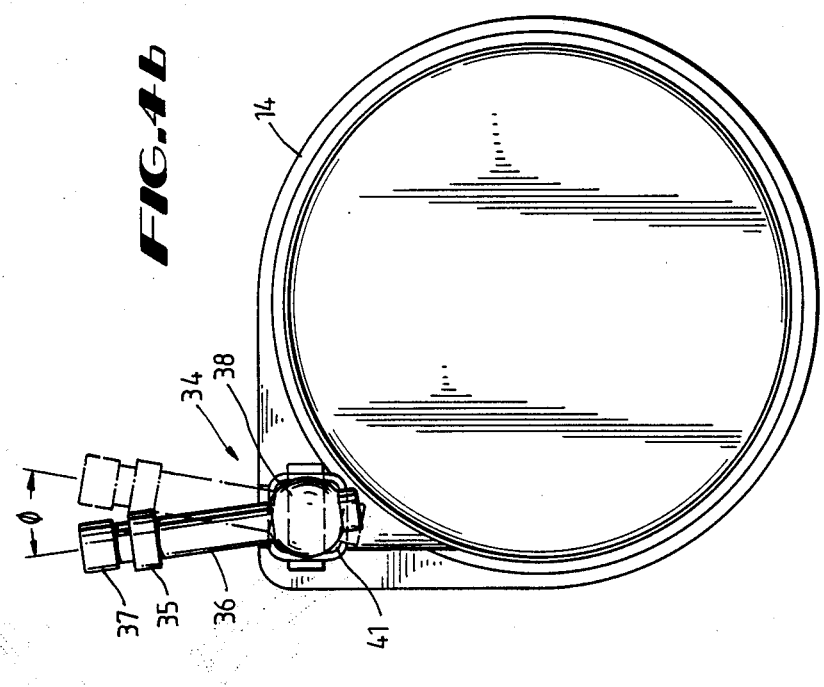
Figure 4A:
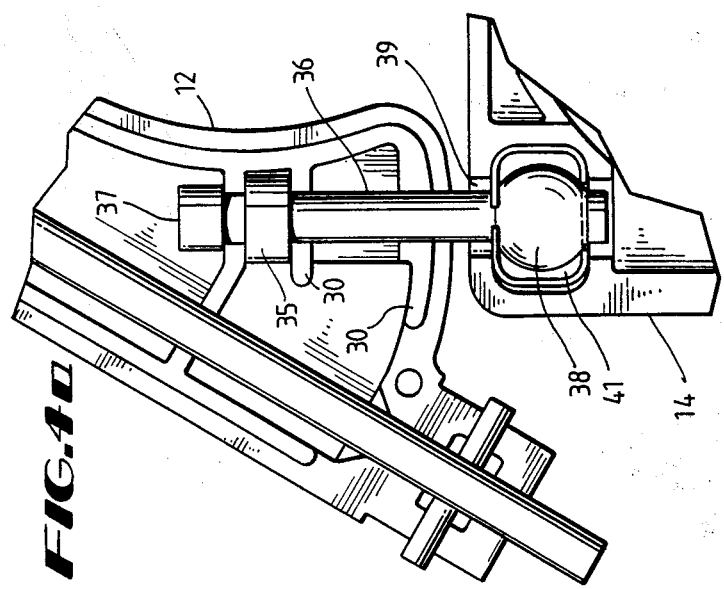

As shown in FIG. 4b, ball-and-socket joint 34 allows for angular and rotary motion of housing 14 in all directions with respect to tubular beam 36. This motion is limited, however, by the size of gaps 39 between beam 36 and housing 14. In FIG. 4b, beam 36 is shown in two extreme positions, with the total allowable angle of adjustment (in the X-Y plane of FIG. 4b) being designated by.

Tubular beam 36, collar 35, ball 38 and cap 37 are shown in greater detail in FIG. 4c.

Referring again to FIG. 3, receiver wires 42 enter housing 12 through ball-and-socket joint 34 and tubular beam 36, as previously described. Receiver wires 42 travel generally adjacent to connecting tube 28, continuing past microphone 24 and printed circuit board 26, where the wires 42 are combined with other wires originating on printed circuit board 26 to form the electrical cable 18. Support struts 30 generally define a path for receiver wires 42, so that the wires 42 do not interfere with other components within housing 12. Electrical cable 18 is secured to housing 12 by means of a resilient strain relief collar 44, which frictionally prevents cable 18 from being forcibly withdrawn from housing 12.

Due to the symmetrical design of housings 12 and 14, headset 10 of the present invention is equally suitable for wearing on either the right of left ear. This capability is further facilitated by the provision of acoustical port holes 32 on both substantially planar faces of receiver housing 14, as well as by the ball-and-socket joint 34 coupling housing 12 to housing 14 and allowing for the adjustment of receiver housing 12 to lie adjacent to either a right or left ear.

Figure 5A:
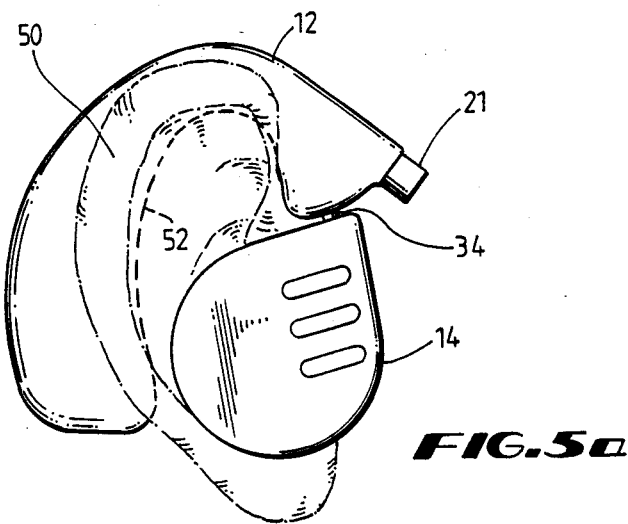
FIGS. 5a and 5b are illustrations of the headset of FIG. 1 being worn on a user's right ear.

In FIG. 5a, an illustration of a headset in accordance with the present invention being worn on the right ear of a wearer is shown. A portion of housing 12 is hidden from view in FIG. 5, behind the auricle 50 of the wearer's ear, as indicated by the dashed line 52. The forwardly-directed portion of housing 12 including cylindrical protrusion 21 extends slightly in front of the ear, not covered by auricle 50. With housing 12 in this position, cylindrical protrusion 21 is directed forward and down, generally in the direction of the wearer's mouth.

Receiver housing 14 rests in front of the external acoustic meatus of the ear, coupled to housing 12 by means of ball-and-socket joint 34. While a conventional swiveling connection, such as a stationary shaft or pin could be employed to couple housing 14 to housing 12, a ball-and-socket joint is preferred due to the increased freedom of adjustment which it affords.

Figure 5B:
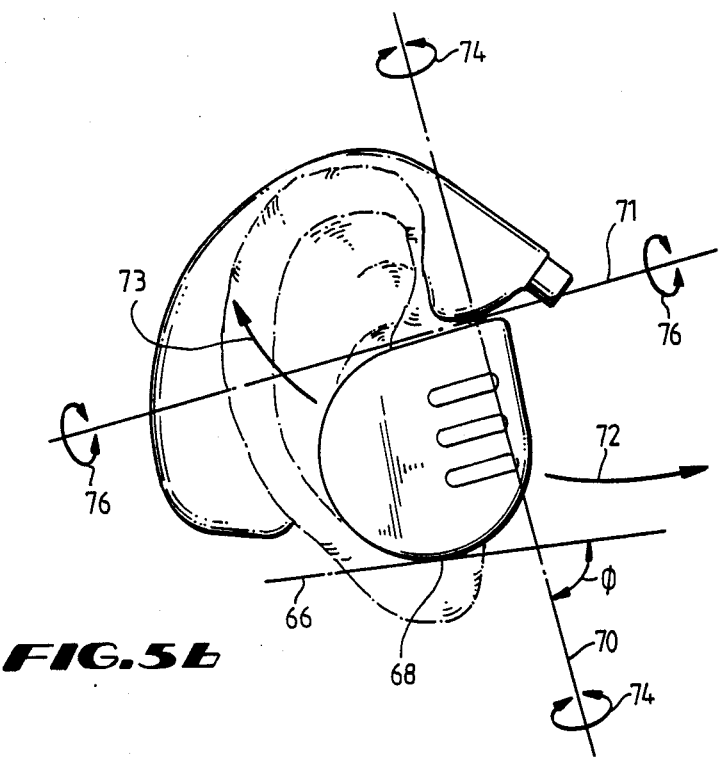

In FIG. 5b, line 66 is tangent to housing 14 at the arbitrarily chosen point 68, and is fixed with respect to housing 14. Line 70 indicates the direction in which tubular mounting beam 36 extends from housing 12, along the central plane of housing 12. Line 71, which also lies in the central plane of housing 12, is perpendicular to line 70. Since line 66 is fixed with respect to housing 14, and line 70 (the axis of tubular mounting beam 36) is fixed with respect to housing 12, the angle between lines 66 and 70 is representative of the relative positions of housings 12 and 14, in the two-dimensional plane defined by the central plane of housing 12.

Ball-and-socket joint 34 permits housing 14 to be moved in several directions with respect to housing 12. In particular, the circular movement indicated by arrows 72 and 73 allows receiver housing 14 to be moved generally forward and down (arrow 72) or aft and up (arrow 73) with respect to the wearer's head. This facilitates adaptation of housing 14 to the varying heights and widths of different wearers' ears. Furthermore, ball-and-socket joint 34 permits housing 12 to be rotated about the axis defined by by tubular mounting beam 36 in joint 34 (the axis designated as 70), as indicated by arrows 74; this permits receiver housing 14 to be folded into a position in which it rests lightly against the outer surfaces of the wearer's auricle. Lastly, ball-and-socket joint 34 permits rotation of housing 14 about line 71, as indicated by arrows 76; again, this permits comfortable use by different wearers having various auricular geometries.

In accordance with a further aspect of this embodiment of the invention, the shape of the forwardly-directed portion of housing 12 and positioning of cylindrical protrusion 21 functions to restrict the range of movement of housing 14. Recall from FIG. 3 that receiver wires 42 pass through tubular mounting beam 36 from housing 12 to housing 14, to be received by receiver transducer 46. Cylindrical protrusion 21 limits the rotational motion of housing 14 indicated by arrows 74 in FIG. 5b to less than 360. This limitation is crucial, since it prevents receiver wires 42 from being subjected to excessive stress and repeated over-twisting, possibly leading to wire fatigue or loosened electrical connections.

The limited rotation of housing 14 around axis 70 is more clearly illustrated in FIG. 6a, in which housing 14 and cylindrical protrusion 21 are shown from a line of sight along the axis 70 of cylindrical beam 36. In FIG. 6a, housing 14 is shown in two positions corresponding to the extreme points of rotation about axis 70. Clearly, the arc of rotation designated by the line 78 is less than 360.

FIGS. 6b and 6c are similar axial views of housings 12 and 14 showing the typical relative positions of these housings while headset 10 is being worn on the right and left ears, respectively, of a wearer. In FIG. 6b, acoustical signals produced by receiver 46 in housing 14 travel in the direction indicated by arrow 80 to be heard by the wearer; in FIG. 6c, sound heard by the wearer travels in the direction shown by arrow 82. Since the rotation of housing 14 about axis 70 is limited to less than a complete rotation, it is necessary for acoustical signals to be emitted from both planar faces of housing 14, in the directions indicated by arrows 80 and 82 in FIGS. 6b and 6c. Accordingly, and in keeping with the overall symmetry of housings 12 and 14, acoustical port holes 32, such as are shown in FIG. 1, are provided on both sides of housing 14. Acoustical port holes 32 must be of sufficient size to allow sound to be emitted from housing 14 without undue acoustical degradation.

From the above detailed description of a specific embodiment, it should be evident that a lightweight, monaural communications headset has been disclosed which is capable of being worn on either the right or left ear of a user.

Although a specific embodiment has been disclosed in detail, it is to be understood that various changes, alterations and substitutions can be made therein without departing from the spirit and scope of the present invention as defined in the appended claims. For example, an alternate embodiment of the present invention is contemplated which utilizes a "boom mounted" microphone arrangement. In this case, a miniature microphone transducer is disposed at the distal end of an adjustable boom originating on the post-auricular headset capsule housing. A swiveling or pivoting connection between the boom and the housing allows the microphone to be positioned in front of the wearer's mouth, when the headset is worn on the right and when it is worn on the left ear. Microphone wires are conducted through the boom and are received on the printed circuit board contained in the post-auricular housing.

What is claimed is:

1. A communications headset comprising:
    a first housing containing a microphone transducer and electronic circuitry, the first housing being symmetrical about a central plane and having a substantially hook-shaped outline in its central plane, such that said housing can be lowered into a secure, post-auricular position, the interior curve of said hook shape engaging the wearer's ear and securing said housing behind the auricle, around the rear and top of the ear, with a forwardly-directed portion of the first housing extending partially in front of the ear, said forwardly-directed portion having a cylindrical protrusion extending therefrom;
    a second housing, symmetrical about a central plane and having a substantially teardrop-shaped outline in its central plane, containing an acoustical receiver having wires coupled thereto, the second housing having acoustical port holes on both of its substantially planar and teardrop-shaped outer surfaces and being coupled near its apex to said forwardly-directed portion of the first housing with a ball-and-socket joint which allows limited angular and rotary movement of the second housing with respect to the first housing such that the second housing may be folded inwardly to a position substantially parallel with the external surfaces of the wearer's ear, the ball-and-socket joint also permitting rotation of the second housing about the axis of the ball-and-socket joint, the extent of said rotation being limited by the cylindrical protrusion on said forwardly-extending portion of the first housing, the ball-and-socket joint further defining a hollow channel between the first and second housings through which said receiver wires pass; and a flexible, telescoping voice tube having proximal and distal ends, the proximal end detachably coupled to said cylindrical protrusion on the forwardly-directed portion of the first housing, said voice tube extending forward and down from the first housing such that the distal end can be positioned generally in front of the wearer's mouth.

2. A communications headset apparatus comprising:

a first housing, symmetrical about a central plane and having a substantially hook-shaped outline in said plane, for containing a microphone transducer and electronic circuitry, said hook-shape allowing the first housing to be worn in a conventional post-auricular manner with the first housing originating aft of a wearers ear, curving over the top of the ear, and extending partially forward of the ear;

a second housing, symmetrical about a central plane and having a substantially teardrop-shaped outline in its central plane, for containing an acoustical receiver having wires coupled thereto, the second housing having acoustical port holes on both of its substantially planar, teardrop-shaped surfaces;

a ball-and-socket joint, for coupling an edge of said second housing near its apex to the forwardly extending portion of the first housing, the ball-and-socket joint allowing angular and rotary motion of the second housing in every direction with respect to the first housing within certain limits, the ball-and-socket joint defining a hollow channel between the first and second housings through which said receiver wires may pass; and a flexible, telescoping voice pick-up tube having proximal and distal ends, the proximal end detachably coupled to a cylindrical protrusion on said forwardly extending portion of the first housing, and the distal end positionable generally in front of the wearer's mouth, said protrusion preventing the complete rotation of the second housing about the axis of the ball-and-socket connection.

3. A communications headset comprising:

a first housing containing electronic circuitry, the first housing being symmetrical about a central plane and having a substantially hook-shaped outline in said central plane, such that said housing can be lowered into a secure, post-auricular position, an interior curve of said hook shape engaging the wearer's ear and securing said housing behind the auricle, around the rear and top of the ear, with a forwardly-directed portion of the first housing extending partially in front of the ear;

a second housing, symmetrical about a central plane and having a substantially teardrop-shaped outline in its central plane, containing an acoustical receiver having wires coupled thereto, the second housing having acoustical port holes on both of its substantially planar and teardrop-shaped outer surfaces and being coupled near its apex to said forwardly-directed portion of the first housing with a ball-and-socket joint which allows limited angular and rotary movement of the second housing with respect to the first housing such that the second housing may be folded inwardly to a position substantially parallel with the external surfaces of the wearer's ear, the ball-and-socket joint also permitting rotation of the second housing about the axis of the ball-and-socket joint, the extent of said rotation being physically constrained within limits defined by the shape of said forwardly-directed portion of the first housing, the ball-and-socket joint further defining a hollow channel between the first and second housings through which said receiver wires may pass; and a microphone electrically coupled to said electronic circuitry, for converting the wearer's speech into electrical signals.

4. A communications headset apparatus comprising:

a first housing, symmetrical about a central plane and having a substantially hook-shaped outline in said plane, for containing electronic circuitry, said hook-shape allowing the first housing to be worn in a conventional post-auricular manner with the first housing originating aft of a wearer's ear, curving over the top of the ear, and extending partially forward of the ear;

a second housing, symmetrical about a central plane and having a substantially teardrop-shaped outline in its central plane, for containing an acoustical receiver having wires coupled thereto, the second housing having acoustical port holes on both of its substantially planar, teardrop-shaped surfaces;

a ball-and-socket joint, for coupling an edge of said second housing near its apex to the forwardly extending portion of the first housing, the ball-and-socket joint allowing angular and rotary motion of the second housing with respect to the first housing within certain limits defined by the shape of the forwardly-extending portion of the first housing, the ball-and-socket joint defining a hollow channel between the first and second housings through which said receiver wires may pass; and a microphone electrically coupled to said electronic circuitry, for converting the wearer's speech into electrical signals.

* * * * *